United States Patent
Chen et al.

(10) Patent No.: US 8,394,915 B2
(45) Date of Patent: Mar. 12, 2013

(54) POLYESTERIFICATION METHOD

(75) Inventors: Hsuan-Ying Chen, Kaohsiung (TW); Hsin-Jou Fang, Kaohsiung (TW)

(73) Assignee: Kaohsiung Medical University, Kaohsiung (TW)

( * ) Notice: Subject to any disclaimer, the term of this patent is extended or adjusted under 35 U.S.C. 154(b) by 3 days.

(21) Appl. No.: 13/188,832

(22) Filed: Jul. 22, 2011

(65) Prior Publication Data
US 2013/0023692 A1    Jan. 24, 2013

(51) Int. Cl.
*C08G 63/82* (2006.01)
*C08G 63/08* (2006.01)

(52) U.S. Cl. ........................... 528/357; 528/354

(58) Field of Classification Search .................. None
See application file for complete search history.

(56) References Cited

U.S. PATENT DOCUMENTS

| | | | |
|---|---|---|---|
| 4,439,597 A * | 3/1984 | Hall et al. | 528/272 |
| 5,453,479 A * | 9/1995 | Borman et al. | 528/279 |
| 7,767,612 B2 * | 8/2010 | Bellamy et al. | 502/103 |

FOREIGN PATENT DOCUMENTS

TW    200301273    7/2003

* cited by examiner

*Primary Examiner* — Karl J Puttlitz
(74) *Attorney, Agent, or Firm* — Muncy, Geissler, Olds & Lowe, PLLC

(57) ABSTRACT

A polyesterification method comprises steps of mixing, by combining N,N-dialkylformamide dialkyl acetal with a tin catalyst, so as to transfer an alkoxy group from the N,N-dialkylformamide dialkyl acetal to the tin catalyst to obtain a Sn coordination complex; and polymerization, by conducting a ring-opening polymerization of a ester under the catalysis of the Sn coordination complex, and finally to obtain a polyester compound; wherein, the chemical formula of the N,N-dialkylformamide dialkyl acetal is $(RO)_2CHNR_2$, with the R being an alkyl group.

16 Claims, 5 Drawing Sheets

```
┌─────────────────────────┐
│    step of mixing       │
└───────────┬─────────────┘
            │
            ▼
┌─────────────────────────┐
│ step of polymerization  │
└─────────────────────────┘
```

POLYESTERIFICATION METHOD

BACKGROUND OF THE INVENTION

1. Field of the Invention

The present invention relates to a polyesterification method, particularly to a polyesterification method under the catalysis of a tin catalyst, which is highly active and capable of accelerating the production of polymers.

2. Description of the Related Art

Generally, metal catalysts such as aluminum, titanium, lithium, or tin are widely used in industries to catalyze the processes of esterification and polyesterification, so that the processes of esterification and polyesterification can be performed in a time-saving process.

Tin catalysts, such as stannous(II) 2-ethylhexanoate, stannous sulfate, stannous dichloride, and dibutyltin oxide, are commonly used in catalysis of a ring-opening polymerization so as to obtain polymers in a high efficiency. Frankly, the activity of the tin catalysts is low, and therefore, the catalysis of the tin catalysts only can be well performed under long term of high temperature. Accordingly, it is wasteful in used of time and energy for the production of polymers, which may burden the industry with heavy cost.

In Taiwan Patent No. TW200301273 entitled "METHYLTIN CATALYSTS FOR POLYESTERFICATION," a conventional catalyst, being a methyltin compound, for polyesterfication is disclosed, and which can be used as a catalyst in esterfication or polyesterfication under high temperature. With the performance of the methyltin compound, the esters and polyesters produced by the process possess superior physical properties and chemical properties, such as high quality of color, thermal stability and purity. The conventional catalyst is suitable to be used in multistages of polyesterification reactions, and which is quiet frugal in catalyst use.

However, the conventional catalyst, methyltin compound, still has to be performed at a high temperature, for example high than 200° C., and therefore, a significant amount of energy is necessary for the production of polymers as usual. In this way, the polyesterification of industries only can be achieved in an energy-and-cost wasting process yet.

Moreover, the said conventional catalyst is sensitive to air, being easy to react with oxygen and steam in air, with the result that the activity of the conventional catalyst is decreased. Hence, the conventional catalyst not only cannot improve the disadvantages of the tin catalysts in catalysis of polyesterification, but leads to much more amounts of energy and cost in use.

It is suggested that, there is an urgent need of providing a method of polyesterification, which can effectively improve the disadvantages of the conventional arts and dramatically promote the efficiency of the tin catalyst in polyesterification process.

SUMMARY OF THE INVENTION

The primary objective of this invention is to provide a method of polyesterification, in which a tin catalyst with high activity in catalyzing polyesterification is obtained and used, so that the polyesterification can be conducted in a highly efficient process.

The secondary objective of this invention is to provide a method of polyesterification, in which a tin catalyst being less sensitive to air is obtained and used, so that the polyesterification can be well-performed under the catalysis of the tin catalyst.

A polyesterification method comprises steps of mixing, by combining N,N-dialkylformamide dialkyl acetal with a tin catalyst, so as to transfer an alkoxy group from the N,N-dialkylformamide dialkyl acetal to the tin catalyst to obtain a Sn coordination complex; and polymerization, by conducting a ring-opening polymerization of a ester under the catalysis of the Sn coordination complex, and finally to obtain a polyester compound; wherein, the chemical formula of the N,N-dialkylformamide dialkyl acetal is $(RO)_2CHNR_2$, with the R being an alkyl group.

Further scope of the applicability of the present invention will become apparent from the detailed description given hereinafter. However, it should be understood that the detailed description and specific examples, while indicating preferable embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Figure 1:
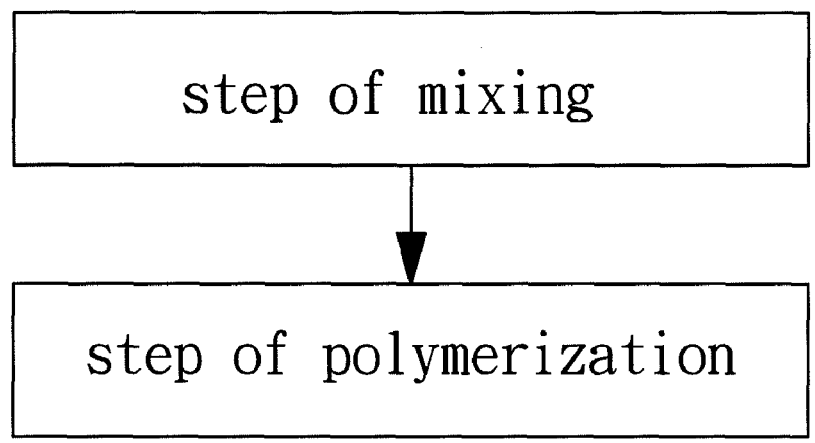
FIG. 1 is a diagram illustrating a preferable embodiment of a polyesterification method in the present invention.

All figures are drawn for ease of explaining the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions conforming to specific force, weight, strength, and similar requirements will likewise be within the skill of the art after the following teachings of the present invention have been read and understood. Furthermore, when the term "first", "second" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

In accordance with FIG. 1, a preferable embodiment of a polyesterification method in the present invention is shown and comprises a step of "mixing S1" and a step of "polymerization S2".

In the step of "mixing S1," a N,N dialkylformamide dialkyl acetal and a tin catalyst is prepared and mixed with each other to obtain a Sn coordination complex, wherein, with the said mixing, an alkoxy group is transferred from the N,N-dialkylformamide dialkyl acetal to the tin catalyst. According to FORMULA 1, the chemical formula of the N,N-dialkylformamide dialkyl acetal is shown, with the R being an alkyl group.

$(RO)_2CHNR_2$  FORMULA 1

More precisely, the Sn coordination complex obtained from the step of "mixing S1" is analogous to polymerization initiator, and which is capable of being used in a ring-opening polymerization of the step of "polymerization S2," as a polymerization initiator. The tin catalyst of the present invention can be stannous(II) 2-ethylhexanoate, stannous sulfate, stannous dichloride, or dibutyltin oxide, and the N,N-dialkylformamide dialkyl acetal can be one of N,N-dimethylformamide dimethyl acetal and N,N-dimethylformamide diethyl acetal.

Preferably, a N,N-dimethylformamide dimethyl acetal (DMF-DMA) is selected and used in the step of "mixing S1" of the present embodiment, with the result that a methoxyl group of the DMF-DMA is easy to be transferred to the tin catalyst. With such arrangement, the Sn coordination complex, being significantly stable in structure and conformation, can be obtained in the present invention. Furthermore, the methoxyl group of the DMF-DMA is sufficient to co-react with an ester and to catalyze a ring-opening polymerization of the ester. In this way, the Sn coordination complex obtained from the step of "mixing S1" can be further used in the following step of "polymerization S2," so as to conduct a ring-opening polymerization of ester in a preferable efficiency.

As an example, the DMF-DMA and stannous(II) 2-ethylhexanoate in a weight ratio of 1:1 are prepared and mixed up with toluene, followed by being heated at 100° C. for 30 minutes, being vacuum-pumped till volatile compounds has removed, and being washed with n-hexane to remove organic solvents and obtain a Sn coordination complex. The Sn coordination complex obtained in the present embodiment is oily.

Figure 2A:
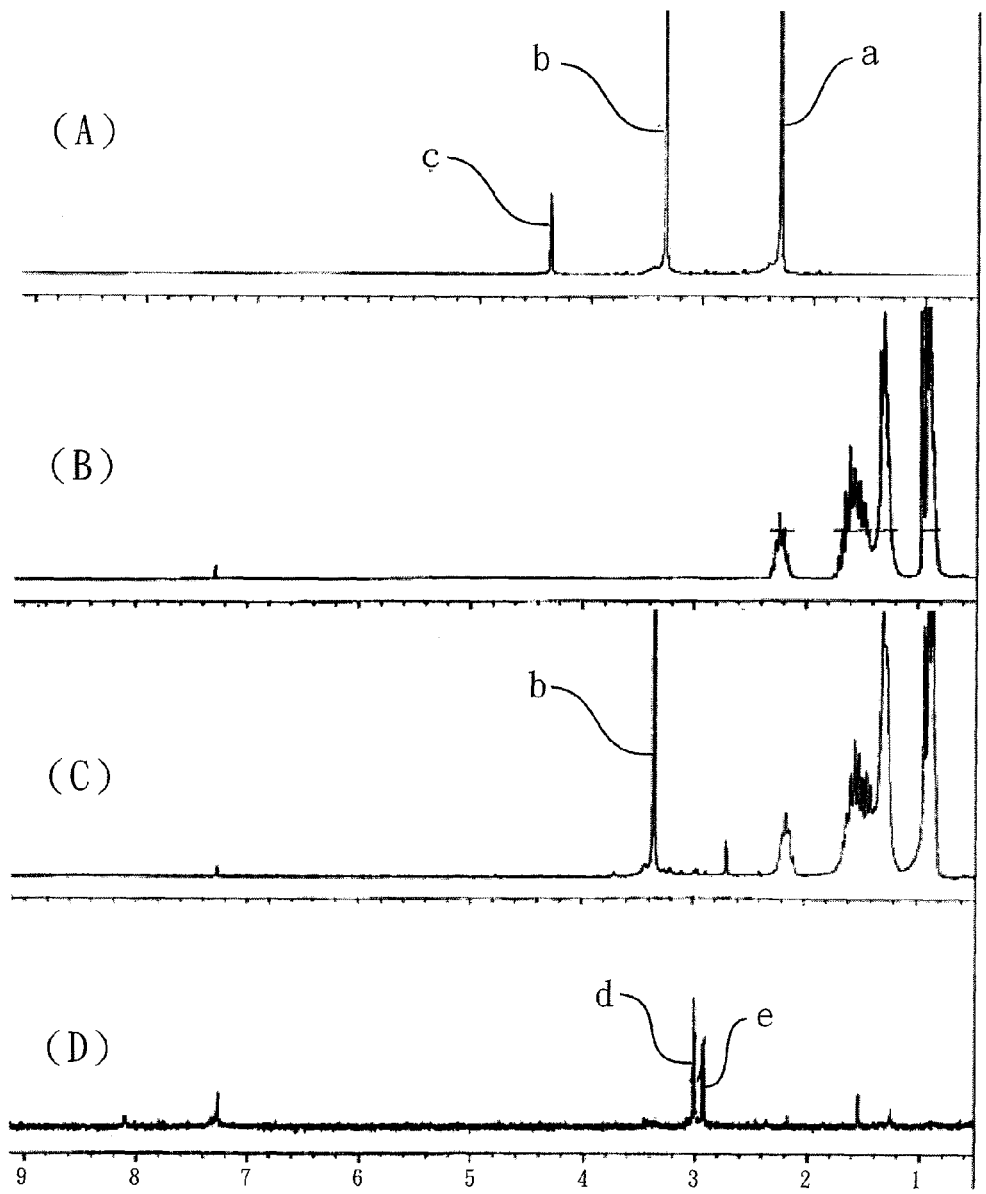
FIG. 2a is a serial of spectrograms in the present invention.
Figure 2B:
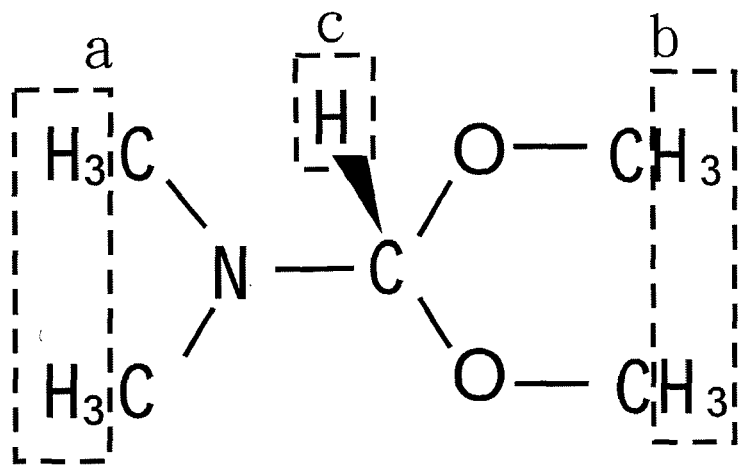
FIGS. 2b and 2c are chemical formulas of the present invention.
Figure 2C:
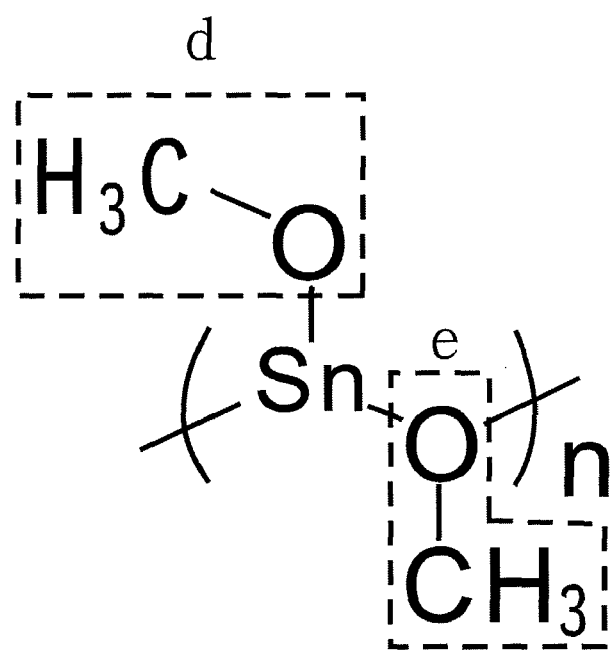
Figure 3:
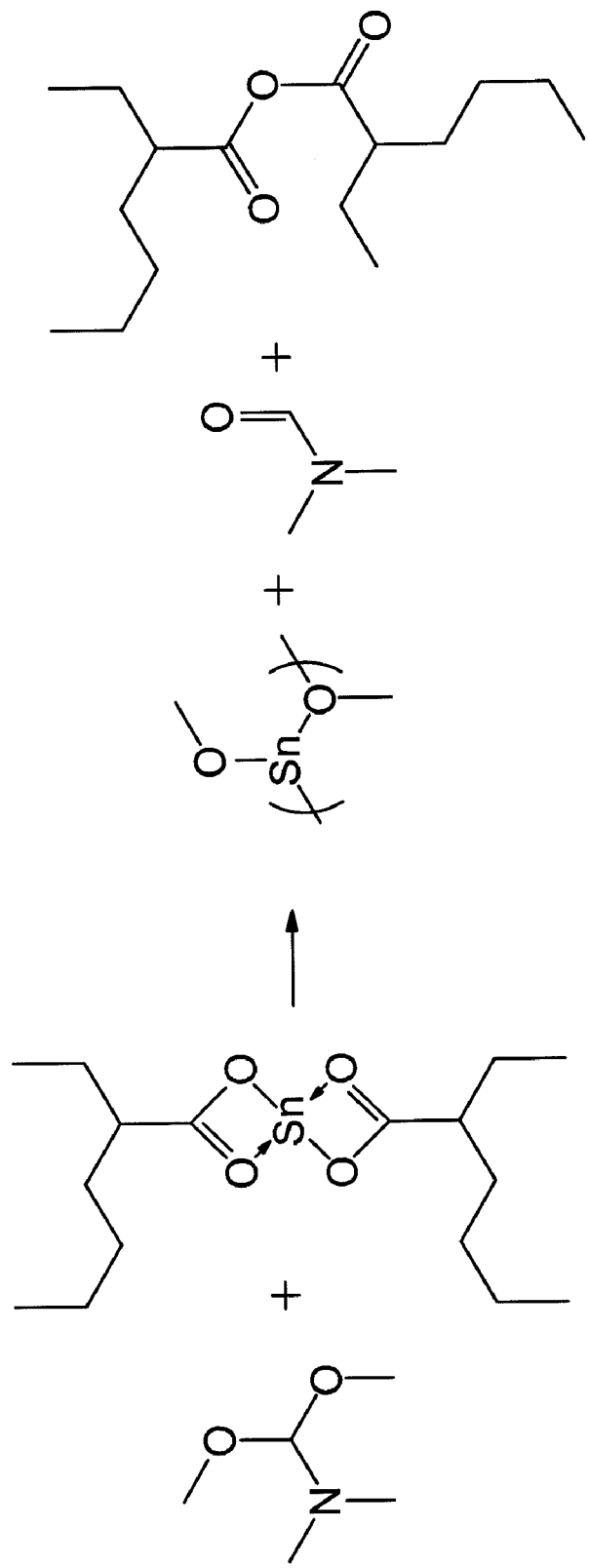
FIG. 3 is a diagram illustrating a chemical reaction of the present invention.

In FIG. 2a, spectrograms of DMF-DMA (A), stannous(II) 2-ethylhexanoate (B) and Sn coordination complex (C) are displayed. It is noted that signals "a" and "c" shown on the spectrograms of DMF-DMA (A) are no longer found on the spectrograms of Sn coordination complex (C). However, signal of methyl group, for example signal "b" on the spectrogram (A), and signal of the Sn coordination complex in the spectrograms (C) are still found. As it is shown in FIG. 2b, the signal "a" is hydrogen of methyl amino group, the signal "b" is hydrogen of methoxyl group, and the signal "c" is hydrogen of methylyen group. Furthermore, for further proving the relationship between DMF-DMA and tin catalyst in structure, an analysis data of a mix of the DMF-DMA and tin dichloride is provided in spectrogram (D) of FIG. 2a, in which, signals of two methoxyl groups, "d" and "e" are observed. It is supposed that one of the two methoxyl groups has a bridge structure (with reference to "e" of FIG. 2c), and the other one binds to Sn (with reference to "d" of FIG. 2c). Also, with reference to $Sn^{119}$ NMR, and the spectrogram of Sn coordination complex and stannous(II) 2-ethylhexanoate, there is less difference in spectral shift between the Sn coordination complex and the stannous(II) 2-ethylhexanoate. As a result, the valence number of the Sn in the Sn coordination complex can maintain at $2^+$. In accordance with foregoing evidences, the mechanism of catalyst synthesis is clearly defined in FIG. 3. Therefore, with the mixing of the DMF-DMA, the activity of the stannous(II) 2-ethylhexanoate in the catalysis of ring-opening polymerization can be significantly promoted due to the performance of methoxyl group.

In the step of "polymerization S2," a ring-opening polymerization is conducted with the catalysis of the Sn coordination complex obtained from the step of "mixing S1," in order to obtain a polyester polymer. Precisely, Sn coordination complex of the present invention has a methoxyl group, which can co-react with an ester and to catalyze a ring-opening polymerization of the cycloester. Preferably, a solvent, such as toluene, is prepared and used in the step of "polymerization S2," in order to conduct the ring-opening polymerization in the solvent so as to achieve the polymerization of cycloesters in a preferable efficiency. With such performance, the methoxyl group of the Sn coordination complex can act with the terminal end of an ester, where cyclic monomers are sequentially joined to form a larger polymer chain through propagation. In this way, polyester will be obtained.

As an example, the Sn coordination complex of the present invention is mixed with 25 times weight of s-caprolactone in order to triggering off a ring-opening polymerization of the s-caprolactone. The methoxyl group of the Sn coordination complex initiates ϵ-caprolactone coordinating to Sn, and ϵ-caprolactone is opened to become a new initiator. More and more monomers are sequentially opened and produced a larger polymer chain of ϵ-caprolactone in a preferable efficiency.

Figure 4:
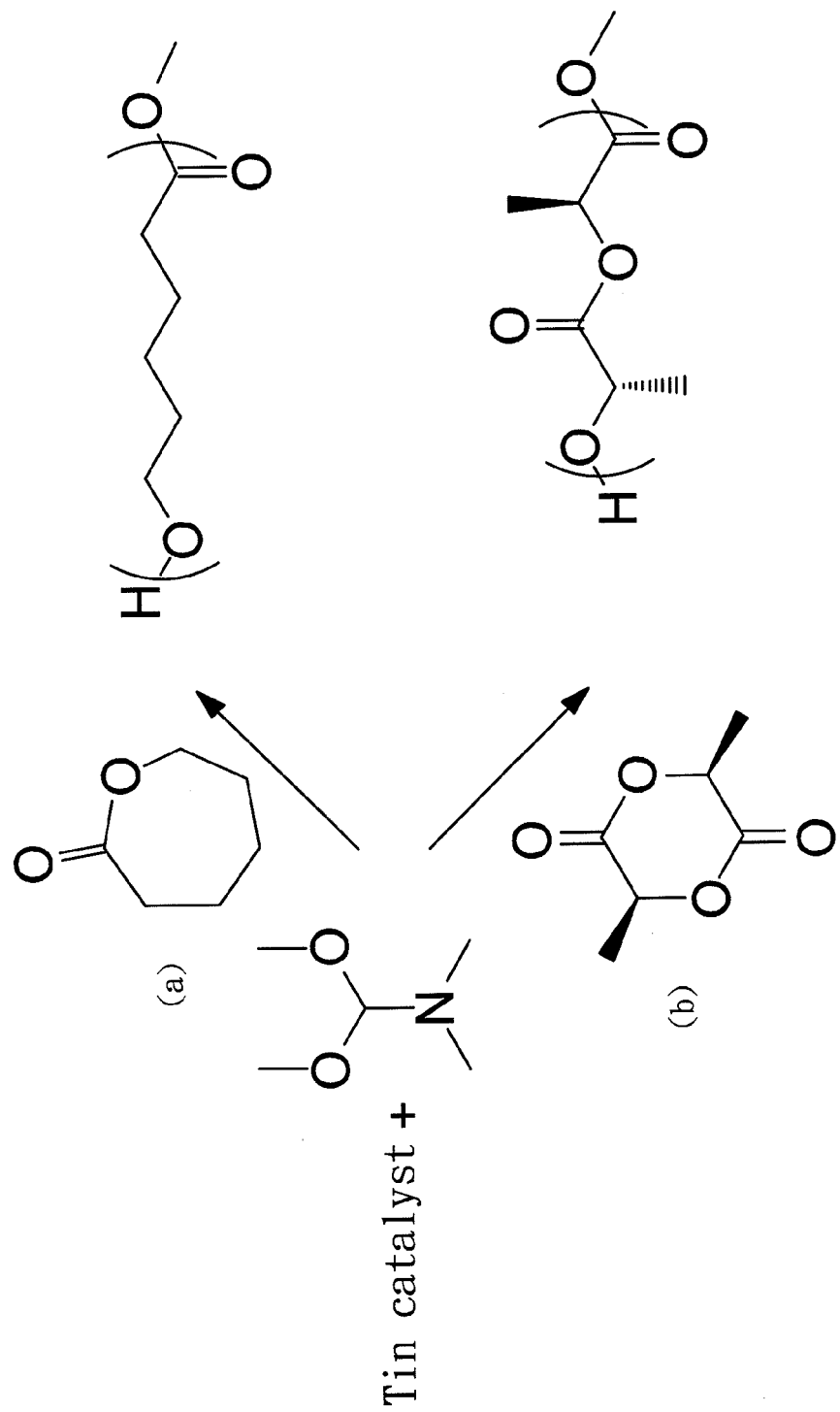
FIG. 4 is another diagram illustrating another chemical reaction of the present invention.

In other embodiment of the present invention, the DMF-DMA can be further mixed with various tin catalysts to obtain various Sn coordination complexes, so that the polyesterification of the ϵ-caprolactone or L-lactide can be conducted under the catalysis of those Sn coordination complexes. With reference to FIG. 4, the chemical reactions of the polyesterification of the caprolactone (A) and the polyesterification of the L-lactide (B) are shown individually.

Through the present invention, a polyesterification method is provided by mixing up N,N-dialkylformamide dialkyl acetal with a tin catalyst at first to obtain a Sn coordination complex, and further providing the Sn coordination complex to ester to conduct a ring-opening polymerization of ester under the catalysis of the Sn coordination complex. The Sn coordination complex has a methoxyl group, which can act with the terminal end of the ester and trigger off the polyesterification of the ester in a high efficiency. With such situation, the polyesterification of cycloesters can be achieved at a low temperature, without additionally adding of polymerization initiator so as to obtain polyester polymers with larger polymer chain in a time-and-cost saving process.

Additionally, the mixing of the N,N-dialkylformamide dialkyl acetal will only change the bonds of the tin catalysts, and therefore, the physical properties and chemical properties, such as its valence number and air sensitivity of the tin catalyst are all maintained. Accordingly, the Sn coordination complex of the present invention is less sensitive to air so that it is sufficient to catalyze the polyesterification in a superior efficiency even with presence of air.

In the following paragraphs, to verify the benefits of the polyesterification method in the present invention, polymerizations of ϵ-caprolactone and L-lactide are conducted under the catalysis of various tin catalysts and Sn coordination complexes. In the present embodiment, the catalysis time and the production rate of each tin catalyst and Sn coordination complex is analyzed and recoded. Furthermore, the polydispersity index (PDI) of each polyester polymer obtained via each condition is analyzed via gel permeation chromatography (GPC) in the present embodiment.

Referring to TABLE 1-1, the various tin catalysts and Sn coordination complexes of the present embodiment, including a mixture of stannous(II) 2-ethylhexanoate and DMF-DMA (A1), stannous(II) 2-ethylhexanoate (A2), a mixture of stannous sulfate and DMF-DMA (B1), stannous sulfate (B2), a mixture of stannous dichloride and DMF-DMA (C1), stannous dichloride (C2), of a mixture of dibutyltin oxide and DMF-DMA (D1), and dibutyltin oxide (D2), are prepared and mixed with 25 times weight of ϵ-caprolatone (CL) (2M) and 10 mL of toluene to conduct a ring-opening polymerization of the ϵ-caprolatone at 100° C., wherein the stannous(II)

2-ethylhexanoate, the stannous sulfate, the stannous dichloride, and the dibutyltin oxide are all in a molarity of 0.08 M. In the present embodiment, the same volume of benzyl alcohol (BnOH) as the initiator in the ring-opening polymerization of the ε-caprolatone are additionally added into the tin catalysts, including stannous(II) 2-ethylhexanoate (A2), stannous sulfate (B2), stannous dichloride (C2), and dibutyltin oxide (D2).

TABLE 1-1

Catalysis of Various Tin Catalysts

| Catalysts | Time (mins) | Convertion (%) | Molecular Weight of products | PDI of products |
|---|---|---|---|---|
| A1 | 10 | 92 | 4500 | 1.10 |
| A2 | 120 | 95 | 5000 | 1.19 |
| B1 | 90 | 87 | 3800 | 1.20 |
| B2 | 90 | 4 | — | — |
| C1 | 10 | >99 | 9200 | 1.42 |
| C2 | 10 | 17 | — | — |
| D1 | 10 | 93 | 9100 | 1.72 |
| D2 | 10 | 0 | — | — |

According to TABLE 1-1, it is noted that all the mixture of DMF-DMA with various tin catalysts, (A1, B1, C1, and D1), have significant improvement in its conversion as in comparison with tin catalysts of (A2), (B2), (C2) and (D2). It is proved that with the mixing of the DMF-DMA, Sn coordination complexes are obtained and capable of being superior active in the catalysis of polyesterification.

Next, with reference to TABLE 1-2, in groups (E1) and (E2), a mixture of stannous(II) 2-ethylhexanoate and DMF-DMA, and stannous(II) 2-ethylhexanoate are separately mixed with 25M of ε-caprolatone (CL) and xylene to conduct a ring-opening polymerization of the ε-caprolatone at 140° C. for 2 hours, wherein the stannous(II) 2-ethylhexanoate is at a molarity of 0.01M, the volume of the xylene in the group (E1) is 20 mL, but the volume of the xylene in the group (E2) is 5 mL in the present embodiment.

TABLE 1-2

Groups Arrangements in (E1) and (E2)

| Groups | Time (mins) | Conversion (%) | Molecular Weight by GPC | PDI of products |
|---|---|---|---|---|
| E1 | 70 | 76 | 74000 | 3.70 |
| E2 | 70 | 23 | 13900 | 1.25 |

In TABLE 1-2, it is further proved that, with the catalysis of the mixture of stannous(II) 2-ethylhexanoate and DMF-DMA, the conversion and the molecular weight of obtained polyester polymers are increased in comparison with that of tin catalyst. Moreover, the activity of the mixture of stannous (II) 2-ethylhexanoate and DMF-DMA in the catalysis of polyesterification can be particularly promoted at 140° C., so as to produce polyester polymer in a high efficiency.

Additionally, with reference to TABLE 2-1, a mixture of stannous(II) 2-ethylhexanoate and DMF-DMA (a1), stannous(II) 2-ethylhexanoate (a2), a mixture of DMF-DMA and stannous sulfate (b1), stannous sulfate (b2), a mixture of DMF-DMA and stannous dichloride (c1), stannous chloride (c2), a mixture of DMF-DMA and dibutyltin oxide (d1), and dibutyltin oxide (d2), are separately mixed with 50 times weight of L-lactide (LA) (0.5 M) and 10 mL of toluene to conduct a ring-opening polymerization of the L-lactide at 100° C., with all the tin catalysts at a molarity of 0.01M. In the present embodiment, the same volume of benzyl alcohol (BnOH) are additionally added into the tin catalysts, including stannous(II) 2-ethylhexanoate (a2), stannous sulfate (b2), stannous dichloride (c2), and dibutyltin oxide (d2), with the benzyl alcohol being a polymerization initiator in the ring-opening polymerization of the L-lactide.

TABLE 2-1

Catalysis of Various Tin Catalysts

| Catalysts | Time (mins) | Conversion (%) | Molecular Weight by GPC | PDI of products |
|---|---|---|---|---|
| a1 | 20 | 87 | 7600 | 1.10 |
| a2 | 180 | 86 | 4400 | 1.18 |
| b1 | 20 | 59 | 3800 | 1.14 |
| b2 | 20 | 0 | — | — |
| c1 | 120 | 80 | 7200 | 1.22 |
| c2 | 120 | 0 | — | — |
| d1 | 60 | 88 | 7200 | 1.38 |
| d2 | 60 | 0 | — | — |

According to TABLE 2-1, it is noted that all the mixture of DMF-DMA with various tin catalysts, (a1, b1, c1, and d1), show great performance in the catalysis of the ring-opening polymerization, and therefore a preferable conversion yield, and PDI of obtained products can be obtained, especially in comparison with various tin catalysts only (a2), (b2), (c2) and (d2). It is further proved that with the mixing of the DMF-DMA, Sn coordination complexes are obtained and capable of being superior active in the catalysis of polyesterification, whatever in the ring-opening polymerization of ε-caprolatone or L-lactide.

Furthermore, in TABLE 2-2, groups (e1) and (e2) are prepared individually by providing a mixture of stannous(II) 2-ethylhexanoate and DMF-DMA, and stannous(II) 2-ethylhexanoate, with the mixture of stannous(II) 2-ethylhexanoate and DMF-DMA further mixing with 4000 times weight of L-lactide and xylene to conduct a ring-opening polymerization of the L-lactide at 140° C. for 2.8 hours, wherein the stannous(II) 2-ethylhexanoate is at a molarity of 0.0025M and the L-lactide is at a molarity of 10 M. In the preset embodiment, the volume of the xylene in the group (e1) is 40 mL, but the volume of the xylene in the group (e2) is 20 mL.

TABLE 2-2

Groups Arrangements in (e1) and (e2)

| Groups | Time (mins) | Conversion (%) | Molecular Weight by GPC | PDI of products |
|---|---|---|---|---|
| e1 | 170 | — | 405000 | 2.87 |
| e2 | 170 | 9 | — | — |

It is shown that, with the catalysis of the Sn coordination complex in the present invention, the conversion yield and the weight ratio of polymers are dramatically increased in comparison with that of tin catalysts. Therefore, with the polyesterification method in the present invention, polyester polymers with high molecular weight and PDI can be obtained under a low temperature but with high efficiency.

In summary, with the polyesterification method in the present invention, it is beneficial to promote the activity of tin catalysts in catalyzing polyesterification, so that the polyesterification can be performed under a circumstance of air and low temperature, with a result to obtain polyester polymers in a highly efficient but cost- and energy saving process.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A polyesterification method, comprising steps of:
   reacting a N,N-dialkylformamide dialkyl acetal with a tin catalyst, so as to transfer an alkoxy group from the N,N-dialkylformamide dialkyl acetal to the tin catalyst to obtain an alkoxylated Sn coordination complex; and
   conducting a ring-opening polymerization of an ester in the presence of the Sn coordination complex to obtain a polyester polymer;
   wherein, the chemical formula of the N,N-dialkylformamide dialkyl acetal is $(RO)_2CHNR_2$, with the R being an alkyl group.

2. The polyesterification method as defined in claim 1, wherein the N,N-dialkylformamide dialkyl acetal is selected from N,N-dimethylformamide dimethyl acetal or N,N-dimethylformamide diethyl acetal.

3. The polyesterification method as defined in claim 1, wherein the N,N-dialkylformamide dialkyl acetal and the tin catalyst is in a ratio of 1:1.

4. The polyesterification method as defined in claim 2, wherein the N,N-dialkylformamide dialkyl acetal and the tin catalyst is in a ratio of 1:1.

5. The polyesterification method as defined in claim 1, wherein the tin catalyst is selected from stannous(II) 2-ethylhexanoate, stannous sulfate, stannous dichloride, or dibutyltin oxide.

6. The polyesterification method as defined in claim 2, wherein the tin catalyst is selected from stannous(II) 2-ethylhexanoate, stannous sulfate, stannous dichloride, or dibutyltin oxide.

7. The polyesterification method as defined in claim 1, wherein the molarity of the tin catalyst is 0.0025 M to 0.08 M.

8. The polyesterification method as defined in claim 2, wherein the molarity of the tin catalyst is 0.0025 M to 0.08 M.

9. The polyesterification method as defined in claim 1, wherein the ring-opening polymerization is conducted at 100° C. to 140° C.

10. The polyesterification method as defined in claim 2, wherein the ring-opening polymerization is conducted at 100° C. to 140° C.

11. The polyesterification method as defined in claim 1, wherein, the ester is ε-caprolactone, with a molarity at 2 M to 25 M.

12. The polyesterification method as defined in claim 2, wherein, the ester is ε-caprolactone, with a molarity at 2 M to 25 M.

13. The polyesterification method as defined in claim 1, wherein, the ester is L-lactide, with a molarity at 0.5 M to 10 M.

14. The polyesterification method as defined in claim 2, wherein, the ester is L-lactide, with a molarity at 0.5 M to 10 M.

15. The polyesterification method as defined in claim 1, wherein toluene is used as a solvent in the reaction of the tin catalyst and the N,N-dialkylformamide dialkyl acetal.

16. The polyesterification method as defined in claim 2, wherein toluene is used as a solvent in the reaction of the tin catalyst and the N,N-dialkylformamide dialkyl acetal.

* * * * *